United States Patent [19]

Thiersault et al.

[11] Patent Number: 4,774,292

[45] Date of Patent: Sep. 27, 1988

[54] PROPYLENE COMPOSITIONS WITH IMPROVED IMPACT STRENGTH

[75] Inventors: Jean P. Thiersault; Jean C. Roustant, both of Martigues; Alain Senez, Callas-Cabriès, all of France

[73] Assignee: BP Chemical Limited, plc., London, England

[21] Appl. No.: 133,209

[22] Filed: Dec. 16, 1987

Related U.S. Application Data

[63] Continuation of Ser. No. 774,855, Sep. 10, 1985, abandoned, which is a continuation of Ser. No. 508,413, Jun. 28, 1983, abandoned, which is a continuation of Ser. No. 320,299, Nov. 12, 1981, abandoned.

[30] Foreign Application Priority Data

Nov. 13, 1980 [FR] France ............................ 80 24094

[51] Int. Cl.$^4$ ...................... C08L 23/12; C08L 23/18; C08L 23/08
[52] U.S. Cl. .................................................. 525/240
[58] Field of Search ......................................... 525/240

[56] References Cited

U.S. PATENT DOCUMENTS

| | | | |
|---|---|---|---|
| 3,254,139 | 5/1966 | Anderson et al. | 525/240 |
| 3,265,771 | 8/1966 | Ray et al. | 525/240 |
| 3,281,501 | 10/1966 | Coats et al. | 525/240 |
| 3,418,396 | 12/1968 | Edwards et al. | 525/240 |
| 3,426,105 | 2/1969 | Christensen | 525/240 |
| 3,914,342 | 10/1975 | Mitchell | 525/240 |
| 4,076,698 | 2/1978 | Anderson et al. | 526/348.6 |
| 4,078,131 | 3/1978 | Zarauz | 525/194 |

FOREIGN PATENT DOCUMENTS

| | | | |
|---|---|---|---|
| 626733 | 9/1961 | Canada | 525/240 |
| 2405961 | 5/1979 | France . | |
| 52-2072744 | 6/1977 | Japan | 525/240 |
| 54-103478 | 8/1979 | Japan . | |
| 815805 | 7/1959 | United Kingdom | 525/240 |

OTHER PUBLICATIONS

"New Materials"—Plastics World—p. P86, 12/79.
"New Polyethylenes"—Package Engineering, pp. 39–40, 2/80.

*Primary Examiner*—Carman J. Seccuro
*Attorney, Agent, or Firm*—Brooks Haidt Haffner & Delahunty

[57] ABSTRACT

The invention concerns polypropylene compositions with improved impact strength adapted for conversion to finished articles by extrusion drawing, extrusion blow-molding or thermoforming characterized in that they contain:

(a) 40 to 98% by weight of isotactic polypropylene
(b) 2 to 60% by weight of a copolymer of linear low density polyethylene type with a density of up to 0.935, obtained by copolymerizing a mixture of ethylene and one or more upper alpha-olefins, by a copolymerizing process at a pressure below $4.10^6$ Pa, in the absence of any liquid hydrocarbons.

10 Claims, No Drawings

PROPYLENE COMPOSITIONS WITH IMPROVED IMPACT STRENGTH

This application is a continuation of application Ser. No. 774,855 filed Sept. 10, 1985 now abandoned which is a continuation of Ser. No. 508,413 filed June 28, 1983 now abandoned which is a continuation of Ser. No. 320,299 filed Nov. 12, 1981 now abandoned.

This invention relates to polypropylene compositions with improved mechanical properties and particularly impact strength. It more particularly concerns isotactic polypropylene compositions for the applications of extrusion blow-moulding, extrusion drawing and thermoforming, and their method of manufacture.

Articles made of isotactic polypropylene are known to have relatively little impact strength at normal temperatures of use, and to be particularly breakable at temperatures below 5° C. Various methods have already been adopted to overcome this disadvantage. In particular, the incorporation of various elastomers in the polypropylene, such as amorphous copolymers of ethylene and propylene, is known to give a substantial improvement in the impact strength of the polypropylene, especially at low temperatures.

Ternary mixtures have been proposed, particularly for the manufacture of car components. As described in French Pat. No. 1 456 359, these may e.g. comprise from 70 to 94% by weight of isotactic polypropylene, from 5 to 20% by weight of an elastomer of the ethylene/propylene copolymer type and 1 to 25% by weight of polyethylene, generally polyethylene with a density of over 0.940, described as high density polyethylene.

All these compositions containing an elastomer have to be made by appropriate working in machines of the internal mixer type, such as Banbury mixers; these pieces of equipment have a high capital cost and consumer a large amount of energy.

For other applications, such as the manufacture of strips for weaving, it is known to prepare binary mixtures by incorporating low density polyethylene in the isotactic polypropylene, that is to say, polyethylene of a density generally below 0.930, obtained by high pressure polymerisation of radicals, the polyethylene generally being described as "high pressure polyethylene", e.g. in quantities of 5 to 10& by weight. The binary mixtures have improved properties of toughness and impact strength relative to isotactic polypropylene, but the improvement is relatively slight, so the mixtures are only of limited interest.

Applicants have now discovered compositions essentially comprising isotactic polypropylene and some copolymers of ethylene and one or more upper alpha-olefins of the type generally described as "linear low density polyethylene" (LLDP). These compositions have greatly improved properties, particularly impact strength, as compared with the binary mixtures previously known, prepared from isotactic polypropylene and high pressure polyethylene as mentioned above. They are also easy to prepare by mixing in the molten state using extruders of the normal type.

The invention thus concerns polypropylene compositions of improved impact strength, essentially comprising:

(a) 40 to 98% by weight of isotactic polypropylene
(b) 2 to 60% by weight of linear low density polyethylene, of a density of below 0.935, obtained by copolymerising 85 to 96% by weight of ethylene with 4 to 15% by weight of one or more upper alpha-olefins by a method of copolymerisation at a pressure below 40 bars, in the absence of any liquid hydrocarbon as a polymerisation medium.

The isotactic polypropylene included in the compositions of the invention may have a mean molecular weight from 50,000 to 500,000. It is possible to use the normal commercially available grades of polypropylene, which are virtually isotactic and particularly suitable for the common applications of injection and extrusion.

The linear low density polyethylene used may be prepared by one of the known methods of polymerising olefins at low pressure, below 40 bars, from a mixture of ethylene and one or more upper alpha-olefins containing 3 to 8 carbon atoms, such as propylene, 1-n-butene, 1-n-hexene, 4-methyl-1-pentene or 1-n-octene. It may advantageously be prepared by the method of copolymerisation in a fluidised bed, described in the French Pat. No. 2 405 961. (U.S. patent application Ser. No. 161,665).

The advantageous properties of the polypropylene compositions of the invention are thought to be obtained by virtue of the special nature of the low linear density polyethylenes which are obtained by a copolymerisation process in the absence of any liquid hydrocarbons.

Differential enthalpy analysis in fact reveals that the low linear density polyethylenes have a very specific structure and, in particular, have a relatively large amorphous phase in addition to a crystalline phase.

To give an example, the differential enthalpy analysis curves relating to two LLDP's with densities of 0.920 and 0.928, prepared respectively from a mixture of ethylene and propylene and a mixture of ethylene and 1-n-butene, have a peak corresponding to a crystalline fraction with a melting point of approximately 120° C., and a shoulder-like portion corresponding to an amorphous fraction with a broad fusion range which remains below 115° C.

The same analyses carried out on high pressure polyethylenes show fusion peaks at temperatures below 115° C. and virtually no broad fusion range.

However the completely unexpected discovery has been made that the compositions of the invention show only one fusion peak in differential enthalpy analysis: everything happens as if the polypropylene crystallised together with the low linear density polyethylene. In the case of known mixtures on the other hand, such as mixtures of isotactic polypropylene with high pressure polyethylene, one can distinguish two fusion peaks on the differential enthalpy analysis curves, corresponding respectively to the isotactic polypropylene and the high pressure polyethylene.

The compositions of the invention can be prepared very easily by mixing the constituents in the molten state.

The simplest and commonest method comprises mixing granules of isotactic polypropylene with granules of linear low density polyethylene, then converting the mixture directly to finished articles on the usual type of processing machines such as extruders or injection presses. It is also possible to start with a mixture of isotactic polypropylene powder and linear low density polyethylene powder, which can be converted to finished articles either directly or after intermediate granulation.

In practice the compositions prepared contain from 2 to 60% by weight of linear low density polyethylene (depending on the applications envisaged) to give the desired properties, such as an increase in flexibility and capacity for hot and cold drawing, and greater strength. These properties are required, particularly for conversion of blow-moulding, extrusion drawing or thermoforming. The application of these methods is thereby facilitated and the articles obtained have better properties, while still having the appearance of isotactic polypropylene, which is not the case when a mixture of isotactic polypropylene and high pressure polyethylene is used.

Without involving any restrictions, the examples which follow illustrate the advantages provided by the mixtures according to the invention compared with known mixtures. In the examples the linear low density polyethylenes used have been prepared by a method of copolymerisation in a fluidised bed. They have the following properties:

linear low density polyethylene trade mark "Natene BD 302" (ethylene/propylene copolymer):

| | |
|---|---|
| Melt index at 2.16 kg and 190° C. (NFT standard 51016-Method A) | = 2 |
| density (standard NFT 51063) | = 0.920 |
| content of groups derived from propylene | = 12% by weight | linear low density polyethylene trade mark "Natene BD 403" (copolymer of ethylene and 1-n-butene):

| | |
|---|---|
| Melt index at 2.16 kg and 190° C. (standard 51016-Method A) | = 1.5 |
| density (standard NFT 51063) | = 0.928 |
| content of groups derived from 1-n-butene | = 6.7% by weight |

For its part the high pressure polyethylene (HP polyethylene) used as a comparison in the examples has a fluidity index at 2.16 kg and 190° C. of 2 and a density of 0.92 C.

EXAMPLE 1

Ninety parts by weight of a polypropylene sold under the name of "Napryl 62041 AG", with a melt index at 5 kg and 230° C. of 1.2, is mixed with 10 parts by weight of "Natene BD 302" (composition A), in a two screw Werner 29 granulator. To provide a comparison, another mixture is made, consisting of 90 parts by weight of "Napryl 62041 AG" and 10 parts by weight of high pressure polyethylene (HP polyethylene) with a melt index at 2.16 kg and 190° C. of 2 (composition B).

(a) The mechanical properties of the moulded slabs obtained from the two compositions A and B are given in Table I, in comparison with the slabs obtained from "Napryl 62041 AG" alone (C).

The presence of 10% of "Natene BD 302" in composition A is found not to have any adverse effect on the homogeneity of the "Napryl". The elongation at break by traction remains unchanged, which is not the case with compositions containing high pressure polyethylene. It will also be noted that composition A has Charpy impact strength greater than that of composition B and also greater than that of the polypropylene.

(b) The fusion peaks corresponding to compositions A and B are then studied by differential enthalpy analysis: in the case of composition A only one fusion peak is found at approximately 159° C. Everything happens as though the polypropylene and the copolymer crystallised together, whereas in the case of composition B prepared from high pressure polyethylene the fusion peak for polypropylene can be distinguished at 160° C. and that for high pressure polyethylene at 108° C.

(c) Using the compositions described above, one liter bottles weighing 35 g are made by extrusion blow-moulding at 230° C. on a Fischer machine (diameter 50 mm). The properties of the bottles are set out in table II.

The presence of 10% of "Natene BD 302" in composition A brings a very great improvement in the dropping strength of the bottles as compared with that of the bottles made of polypropylene (C), without in any way changing the appearance of the bottles. The dropping strength of bottles made with composition B, comprising a high pressure polyethylene, is midway between that of bottles made of polypropylene (C) and bottles made of composition A.

EXAMPLE 2

Ninety parts by weight of granules of a polypropylene sold under the name of "Napryl 62200 AE", with a melt index at 2.16 kg and 230° C. of 3 are mixed directly with 10 parts by weight of granules of "Natene BD 302". The mixture is extruded at 220°/240° C. on a Reifenhauseur extruder with a diameter of 45 mm, to give a film 100 microns thick, which is cooled in a water bath and drawn into strip form in a Samafor oven. The strips are made with a longitudinal drawing rate of 8 at an oven temperature of 170° C.

By way of comparison, strips are made in the same way from a mixture of 90 parts by weight of "Napryl 62200 AE" and 10 parts by weight of "high pressure" polyethylene, and from "Napryl 62200 AE" alone. As far as use is concerned, no important difference is noticed between the two mixtures and polypropylene alone. On the other hand the properties of the strips set out in table III are different: A great improvement in toughness will be noted for strips containing 10% by weight of "Natene BD 302". The increase in toughness, compared with "Napryl 62200 AE" alone, is more than twice that obtained with strips containing 10% by weight of "high pressure" polyethylene. Hot shrinkage of the strips at 130° C. is less with the mixture containing "Natene BD 302" than with that containing the "high pressure" polyethylene.

EXAMPLE 3

Starting with the sheets of polypropylene "Napryl 62041 AG", 300 cm³ margarine storage jars weighing 4.4 g are made with a Plastiform MP3 thermoforming machine operating at 155° C. Under the same conditions, jars are made from sheets prepared with a composition comprising 90 parts by weight of "Napryl 62041 AG" and 10 parts by weight of "Natene BD 302".

With polypropylene alone, great variation is noted in the thickness of the side walls of the jars, from 0.10 to 0.45 mm. With the composition comprising polypropylene and "Natene BD 302", the thickness of the walls varies only from 0.16 to 0.33 mm. The more even thickness appears to result from the plasticising function of "Natene BD 302" relative to the polypropylene, which makes the material more suitable for drawing.

The more even thickness together with greater impact strength gives stronger jars. This is confirmed by measuring, at 5° C., the dropping height from which 50% of the jars, previously filled with water, break; these heights are 0.70 m for polypropylene jars and 1.2 m for jars made from the polypropylene and "Natene BD 302" composition.

EXAMPLE 4

Compositions are prepared consisting (a) of polypropylene "Napryl 61200 AG" with a melt index of 3 at 2.16 kg and 230° C. and "Natene BD 302" and (b) of "Natene BD 403", by mixing the constituents in the melted state in a two-screw Werner 28 granulator, in respective proportions of 90/10, 80/20 and 70/30 by weight.

To provide a comparison, "Napryl 61200 AG" and high pressure polyethylene are mixed in the same proportions.

The mechanical properties of the moulded slabs obtained from these compositions are given in table IV, where they are compared with slabs obtained with "Napryl 61200 AG" alone.

For an identical loss of rigidity, the compositions based on "Natene BD 302" will be seen to have a less rapid decrease in elongation at break than those prepared with high pressure polyethylene, thus demonstrating the excellent compatibility of the polypropylene with the linear low density polyethylene. The point is also illustrated by the fact that the Charpy impact strength is greater both at 23° C. and at 0° C.

It will also be noted that, with an equal content of linear low density polyethylene, the compositions of the invention prepared from "Natene BD 403", a copolymer of ethylene and 1-n-butene, have mechanical properties and particularly impact strength at least equal to those of compositions prepared from "Natene BD 302", a copolymer of ethylene and propylene.

Table IV also shows the properties of the compositions of the invention containing respectively 40, 50 and 60% by weight of linear low density polyethylene "Natene BD 302". Thus it will be seen that beyond 30% by weight of this polyethylene the flexibility of the compositions of the invention continues to increase with the content of linear low density polyethylene (tensile strength decreases), without any increase in impact strength.

TABLE I

| Product | Density | index at 5 kg and 230° C. | Bending strength (MPa) | Tensile strength (MPa) | Elongation at break (%) | Charpy impact strength (KJ/m$^2$) at 23° C. |
| --- | --- | --- | --- | --- | --- | --- |
| Composition (A) | | | | | | |
| 90% by weight "Napryl 62041 AG" 10% by weight "Natene BD 302" | 0.904 | 1.3 | 60 | 27.5 | 950 | 9 |
| Composition (B) | | | | | | |
| 90% by weight "Napryl 62041 AG" 10% by weight HP polyethylene | 0.903 | 1.2 | 60 | 27 | 500 | 6.5 |
| "Napryl 62041 AG" (C) | 0.902 | 1.2 | 68 | 31 | 950 | 7 |

TABLE II

| Product | Appearance | Dropping strength (Height of fall in meters causing 50% breakage) | | |
| --- | --- | --- | --- | --- |
| | | at 23° C. | at 0° C. | at −10° C. |
| Composition (A) | Translucent | 2.6 | 0.7 | 0.3 |
| Composition (B) | Translucent [less than (C) and (A)] | 2.2 | 0.4 | 0.3 |
| Napryl 62041 AG (C) | Translucent | 1.6 | 0.3 | — |

TABLE III

| Product | Size (dtex) | Toughness (g/dtex) | Elongation at break (%) | Heat shrinkage at 130° C. (%) |
| --- | --- | --- | --- | --- |
| Composition comprising: | | | | |
| 90% by weight "Napryl 62200 AE" 10% by weight "Natene BD 302" | 810 | 6.1 | 15 | 12 |
| Composition comprising: | | | | |
| 90% by weight "Napryl 62200AE" 10% by weight HP polyethylene | 825 | 5.5 | 14 | 14 |
| "Napryl 62200 AE" | 800 | 5.0 | 11 | 10 |

TABLE IV

| Composition: | | | | | | | | | | | | | |
| --- | --- | --- | --- | --- | --- | --- | --- | --- | --- | --- | --- | --- | --- |
| "Napryl 61200 AG" (% by weight) | 100 | 90 | 80 | 70 | 60 | 50 | 40 | 90 | 80 | 70 | 90 | 80 | 70 |
| "Natene BD 302" (% by weight) | | 10 | 20 | 30 | 40 | 50 | 60 | | | | | | |
| "Natene BD 403" (% by weight) | | | | | | | | 10 | 20 | 30 | | | |
| HP polyethylene (% by weight) | | | | | | | | | | | 10 | 20 | 30 |
| Tensile strength (MPa) | 31.5 | 29 | 26 | 23 | 20 | 17 | 14 | 30 | 27 | 25 | 29 | 26 | 23 |
| Elongation at break (%) | 900 | 700 | 650 | 100 | 100 | 100 | 70 | 750 | 650 | 100 | 700 | 450 | 60 |
| Charpy impact strength: (KJ/m$^2$) | | | | | | | | | | | | | |
| at 23° C. | 3 | 4 | 4 | 5 | 4 | 4 | 3 | 4 | 5 | 5 | 3 | 3 | 2 |

TABLE IV-continued

| at 0° C. | 1 | 2 | 2 | 2 | 2 | 2 | 2 | 2 | 2 | 3 | 1 | 1 | 1 |
| --- | --- | --- | --- | --- | --- | --- | --- | --- | --- | --- | --- | --- | --- |

The various properties quoted were measured in accordance with the following standards:

| Measurements | French Standard (NF) |
| --- | --- |
| Melt index | NF T 51016 |
| Density | NF T 51063 |
| Tensile strength | NF T 51034 |
| Charpy impact strength | NF T 51035 |
| Special measurements on film | |
| Resistance to tearing | NF T 54108 |
| Resistance to perforation | NF T 54109 |

Preparation of Natene BD 302

(a) Preparation of catalyst

The following are successively introduced at a temperature of 25° C. into a 1 liter glass balloon flask provided with a mechanical stirrer and a heating and cooling means:

500 ml of n-heptane
9.6 g of magnesium in powder form (0.40 gram-atom)
1.2 g of iodine.

While the contents of the balloon flask are stirred, the contents are heated to 80° C., and the following are introduced:

9.1 g of titaium tetrachloride (48 m.moles)
13.7 g of tetrapropyltitanate (48 m.moles)

and, over a period of 4 hours, 74.5 g of n-butyl chloride (0.805 mole).

The resulting precipitate is washed 3 times, with intermediate decantation, with 200 ml of n-heptane. After drying, the resulting catalyst is analyzed; it contains 8% by weight of titanium.

(b) Preparation of prepolymer

The following are introduced into a 5 liter stainless steel reactor provides with a mechanical stirrer and a heating and cooling means:

1 liter of n-heptane
2.1 g of the catalyst prepared in (a) above
1.3 g of tri n-octylaluminum.

The contents of the reactor is raised, while being stirred, to a temperature of 70° C. Hydrogen is introduced into the reactor, until the relative pressure is $10^5$ Pa, and then ethylene is introduced at a flow rate of 100 g/h. After 2 hours 30 minutes of polymerization, 250 g of a prepolymer is collected, while prepolymer is isolated and then re-suspended in a solution of 2.6 g of tri n-octylaluminum in 500 ml of n-heptane. The n-heptane is then evaporated.

(c) Preparation of Natene BD 302 by fluidized bed polymerization 100 g of a previously prepared polyethylene powder is introduced into a fluidized bed reactor which is 15 cm in diameter. The polyethylene powder is fluidized by a gas flow at a temperature of 80° C. which circulates at a speed of rise of 20 cm/s (calculated in relation to the empty reactor). This gas flow comprises a mixture, by volume, of 55% ethylene, 33% propylene and 12% hydrogen. The prepolymer prepared in (b) above is introduced into the reactor in 5 g portions, every 12 minutes. It is noted that about 800 g/h of powder of polymer is formed. A part of this powder of polymer (Natene BD 302) is periodically removed from the reactor, in order to leave only about 2 kg in the reactor.

Preparation of Natene BD 403

Operation is as in the preparation of Natene BD 302 except as regards the polymerization step where the polymer powder is fluidized by a gas flow at a temperature of 60° C. and the composition of the gaseous mixture is, by volume, 65% ethylene, 21% n-1-butene and 14% hydrogen.

We claim:

1. A polypropylene composition having improved impact strength, comprising
    (a) at least 80% and up to 98% by weight of isotactic polypropylene having a mean molecular weight within the range of 50,000–500,000, and
    (b) 2 to at most 20% by weight of a linear low density polyethylene having a density from 0.92 up to 0.935, a crystalline fraction characterised by a melting point of about 120° C. and an amorphous fraction characterized by a broad fusion range below 115° C., determined by differential enthalpy analysis, the said linear low density polyethylene being further obtained by a copolymerizing 85 to 96% by weight ethylene with 4 to 15% by weight of one or more $C_3$–$C_8$ alpha-olefins in the presence of a solid catalyst based on titanium at a pressure below $4.10^6$ Pa and in the absence of liquid hydrocarbon.

2. The composition of claim 1, further comprising
    (c) said composition showing only one fusion peak in differential enthalpy analysis, characterised as if the polypropylene crystallised together with the linear low density polyethylene.

3. The composition of claim 1, wherein the LLDPE has a density from 0.92 up to 0.928.

4. The composition of claim 1, wherein the LLDPE has a density from 0.928 up to 0.935.

5. The compositions of claim 1, wherein the linear low density polyethylene is prepared from a mixture of ethylene and one or more upper alpha-olefins selected from the group consisting of propylene, 1-n-butene, 1-n-hexene, 4-methyl-1-pentene or 1-n-octene.

6. A method of preparing the compositions of claim 1, comprising mixing the constituents (a) and (b) in the molten state.

7. The method of claim 1, wherein the mixture in the molten state is produced by the introduction of powders or granules of the constituents directly in a machine for conversion to a finished article.

8. A process for the manufacture of finished articles comprising
    providing a composition of claim 1, and
    treating said composition by extrusion drawing, extrusion blow-moulding or thermoforming, so as to produce said finished article.

9. The method as claimed in claim 1 in which the machine for conversion of the powders or granules to a finished article comprises an extruder or injection molding machine.

10. The composition of claim 1, wherein the LLDPE is a copolymer of ethylene and propylene or a copolymer of ethylene and 1-n-butene.

* * * * *